(12) United States Patent
Kim

(10) Patent No.: US 7,084,375 B2
(45) Date of Patent: Aug. 1, 2006

(54) COOKPOT

(76) Inventor: Byung-Doo Kim, 513-801, 5th area, Mokdong apt., Mok 5 -dong, Yangeheon-gu, Seoul (KR) 158-755

(*) Notice: Subject to any disclaimer, the term of this patent is extended or adjusted under 35 U.S.C. 154(b) by 339 days.

(21) Appl. No.: 10/477,860

(22) PCT Filed: May 14, 2002

(86) PCT No.: PCT/KR02/00900

§ 371 (c)(1),
(2), (4) Date: Nov. 14, 2003

(87) PCT Pub. No.: WO02/091890

PCT Pub. Date: Nov. 21, 2002

(65) Prior Publication Data

US 2004/0144259 A1    Jul. 29, 2004

(30) Foreign Application Priority Data

May 15, 2001    (KR) ............................ 2001-14126 U

(51) Int. Cl.
*A47J 27/10* (2006.01)
(52) U.S. Cl. ...................... 219/440; 219/436; 219/437; 219/438; 219/99; 219/403; 219/220; 219/89.1
(58) Field of Classification Search ..................... None
See application file for complete search history.

(56) References Cited

U.S. PATENT DOCUMENTS

| | | | | | |
|---|---|---|---|---|---|
| 1,520,501 | A | * | 12/1924 | Kohn | 99/323 |
| 1,680,743 | A | * | 8/1928 | Leevers | 219/437 |
| 2,303,841 | A | * | 12/1942 | Kircher | 222/545 |
| 2,371,975 | A | * | 3/1945 | Parsons | 219/433 |
| 2,431,582 | A | * | 11/1947 | Page | 219/442 |
| 2,440,128 | A | * | 4/1948 | Sullivan | 219/442 |
| 2,483,979 | A | * | 10/1949 | Morrill | 219/437 |
| 2,522,558 | A | * | 9/1950 | Alvarez | 219/436 |
| 2,571,782 | A | * | 10/1951 | Swenson | 219/440 |
| 2,589,473 | A | * | 3/1952 | Bellucci | 219/533 |
| 2,972,037 | A | * | 2/1961 | Taves | 392/498 |
| 3,111,574 | A | * | 11/1963 | Spini | 392/448 |
| 3,536,893 | A | * | 10/1970 | Cranley | 219/523 |
| 4,238,666 | A | * | 12/1980 | Pomper | 392/448 |
| 4,310,418 | A | * | 1/1982 | Busbey | 210/467 |

(Continued)

Primary Examiner—Joseph Pelham
(74) Attorney, Agent, or Firm—Trojan Law Offices

(57) ABSTRACT

The present invention relates to a cooking appliance used for boiling or cooking food, or more particularly, to a cooking pot, which can rapidly heat water or food, and thereafter can suppress overflowing of water or food therein, while simultaneously maintaining its suitable temperature and pressure, thereby shortening its cooking time while enhancing its safety and convenience during cooking. For this purpose, the cooking pot according to the present invention has a body, into which water or food is placed, and a lid, which covers or uncovers the top opening of said body, wherein said lid comprises an auxiliary heating means at the backside thereof, protruding toward inside of said body, the rim of the backside of which protrudes toward in the direction, to which lid is fitted into said body; a side portion of said lid, having a discharging means of steam, which can be adjusted to discharge steam according to an increase in steam pressure inside said cooking pot; and a knob at the upper side of said lid, having a power connection means, connecting or disconnecting to an outside power supply means, which is electrically connected to said auxiliary heating means.

19 Claims, 7 Drawing Sheets

U.S. PATENT DOCUMENTS 4,546,237 A * 10/1985 Collins ........................ 392/498
4,672,179 A *  6/1987 Onishi et al. ............... 219/441
5,118,927 A *  6/1992 Eisenhauer ................. 219/437
5,730,045 A *  3/1998 Delaquis et al. .............. 99/337

* cited by examiner

COOKPOT

TECHNICAL FIELD

The present invention relates to a cooking appliance for boiling or parboiling food and, more particularly, to a cook pot used for cooking noodles including instant noodles, and for parboiling vegetables.

BACKGROUND OF THE INVENTION

Conventionally, a coffee pot for making coffee and an oriental herb medicine pot for extracting herb extract have electric heating means built in the bottom. On the other hand, most of boiling pots employ as their heat source external heat source such as a gas range.

But, as in a process of cook by the gas range by using conventional pot, when food having a lot of water or broth in them reaches the boiling point, the water or broth often overflows with steam while lifting a lid. If left alone, the flame of the gas range is putted out by the overflowing water and broth, and in worse case, have to supply water and newly add the flavoring according to the additional water in the case of food.

On the other side, in order to the prevent the overflowing it is often left open, without the lid on, even while cooking, or the lid has to be opened now and then, and sometimes the strength of the fire for cook pot has to be correctly adjusted.

But, cooking without a lid, that has disadvantage in the thermal efficiency side, lifting a lid often while cooking troublesome and will cause loss of heat, so more cooking time is required and difficulty in a rational control of the state of cooking.

On the other hand, it is quite troublesome to control the strength of fire directly and difficult to adjust time and extent in correctly.

SUMMARY OF THE INVENTION

Accordingly, the present invention has been made in an effort to solve the problems occurring in the related art, and an object of the present invention is to provide a cook pot which can maximally shorten time required in heating water or cooking food.

Another object of the present invention is to provide a cook pot which can prevent overflowing of the water having great thermal energy even after reaching a boiling point, and can properly keep a steam temperature and a steam pressure, and thereby helping save on energy, secure safety, and add to convenience in cooking.

In order to achieve the above objectives, the cook pot according to the present invention, consisting of a pot body which is filled with water or food, and a lid to opening or shutting the opened upper part of the pot body is characterized in than on the inside of the said lid an supplement heating means is placed projecting deep in the pot body, on the other side of the lid and form a side section which projected to connecting direction with said pot body at the border of the outside of the lid, and having a steam deflation means which can control steam deflation according to steam pressure in the cook pot and equipped the power supply connection section which connect and disconnect to an electric external power supply means at the handle installed on the upper surface of said lid.

Therefore, the cook pot of the present invention, as double heating by the external heating source such as the gas range with a supplement heating means which formed in the cook pot, so the water and foods in the cook pot was more contact with the heat source and heated much faster. And the other, by forming the steam deflation means which can control the steam deflation according to the steam pressure which at the side of the lid which can restrain the overflow of stream deflation and keep the temperature and pressure inside of the cook pot.

Also, the cook pot according to the present invention is characterized as follows: consisting of a lid for opening and shutting the opened upper part of the pot body, from the side section which projected to connecting direction with above pot body at the border of the outside of the cover, and having a steam deflation means which can control the steam deflation according to the steam pressure in the cook pot.

Therefore, the cook pot of the present invention, as double heating by the external heat source such as the gas range with a supplement heating means formed in the cook pot, so water and food in the cook pot are more contact with the heat source and heated rapidly. And by forming the steam deflation means which can control the steam deflation according to the steam pressure at the side of the lid, which can restrain overflowing of stream deflation and maintain the temperature and pressure in the cook pot.

Also, the cook pot according to the present invention, having a pot body which is filled with water or food and a lid for opening and shutting the opened upper part of the pot body, form a supplement heating means which projected to direction of connecting with the said pot body at the border of the other side of the lid, and form the side section having a steam deflation means can control steam deflation according to the steam pressure in the cook pot and form a handle which have pipe-shaped and the supplement heating means which inserted said handle and connected to a group of the external electric wire cable.

Therefore, the cook pot of the present invention, has a built in generating heat coil which heats water and food in the cook pot due to more contact with the heat source leading to more rapid heating.

And by forming the steam deflation means, which can control the steam deflation according to the steam pressure at the side section of the lid, can restrain the overflowing stream deflation and maintain the temperature and pressure in the cook pot.

DETAILED DESCRIPTION OF PREFERRED EMBODIMENTS

Below, the present invention is explained in detail of the present invention by preferable examples to the attached drawings;

EXAMPLE 1

Figure 1:
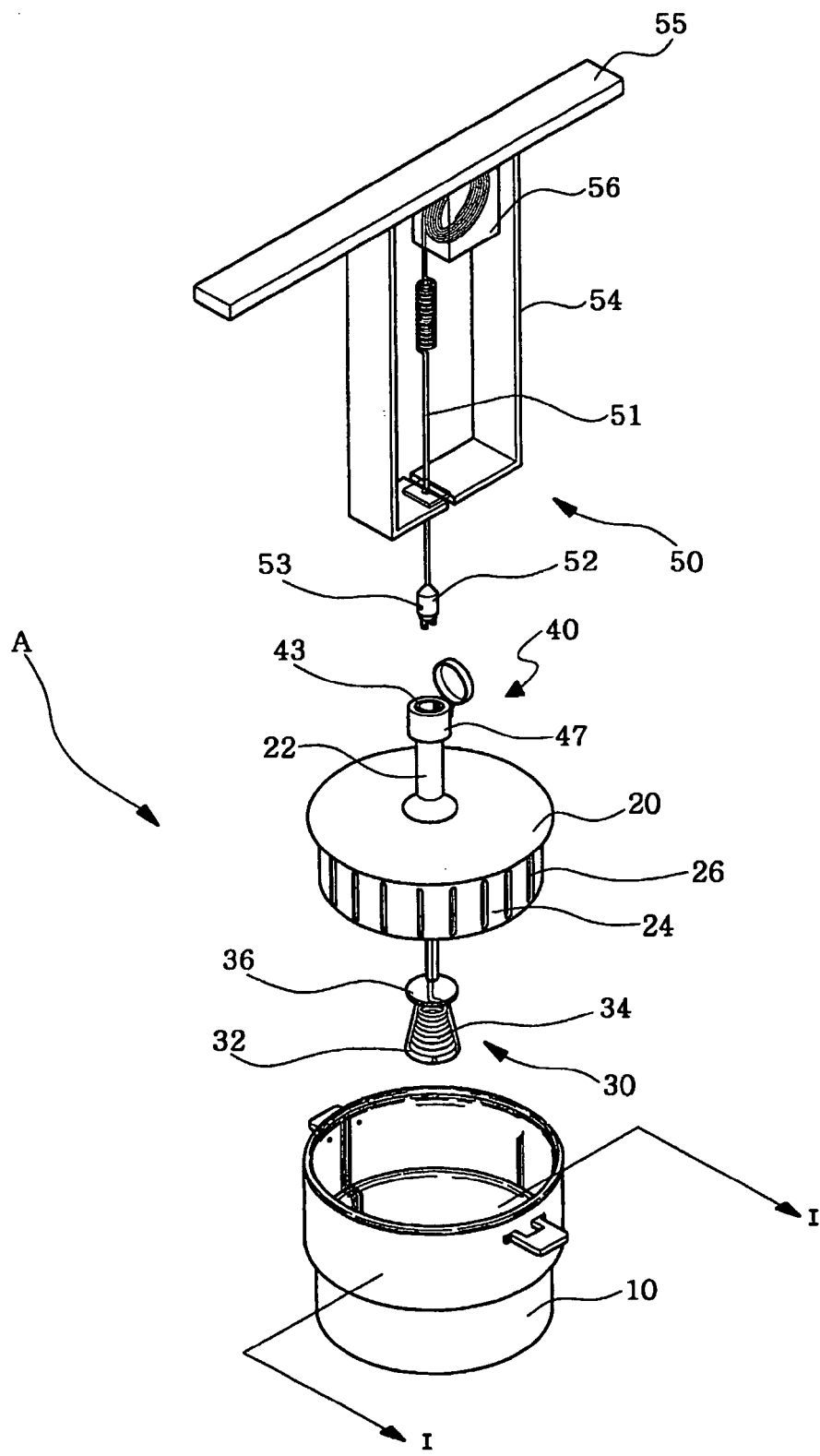
FIG. 1 is an exploded perspective view illustrating a boiling pot having an electric heating means in accordance with a first embodiment of the present invention.
Figure 2:
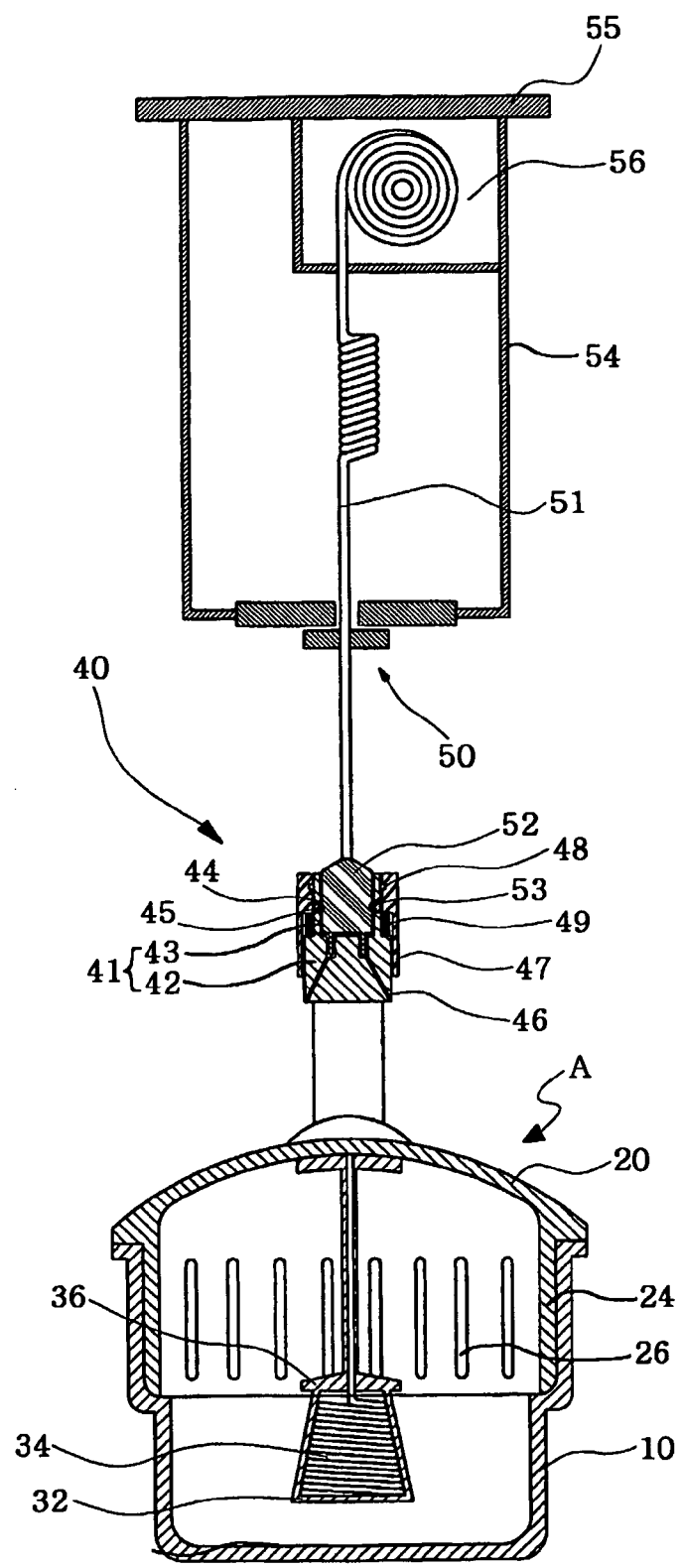
FIG. 2 is a cross-sectional view taken along the line I—I, of FIG. 1, illustrating an assembled state of the boiling pot.
Figure 3:
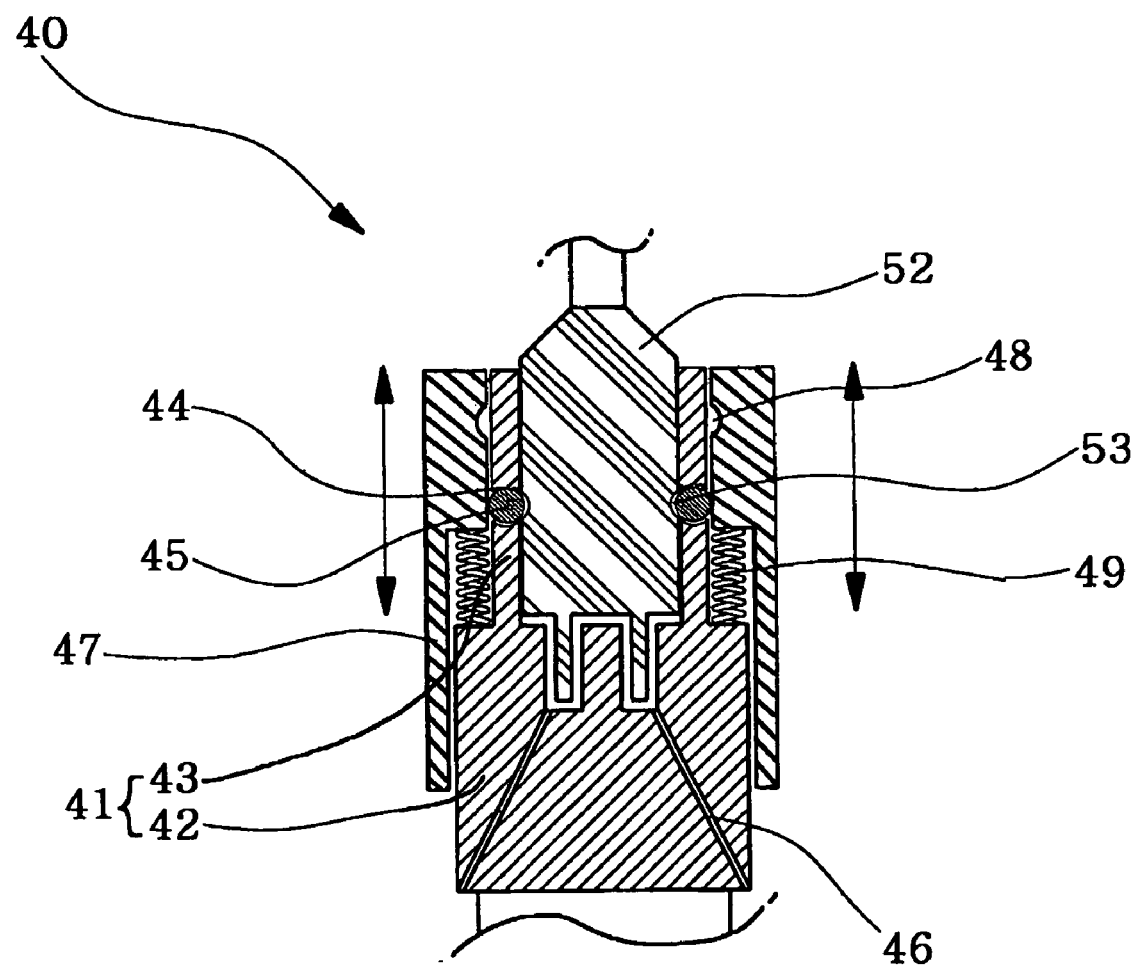
FIGS. 3 and 4 are partial enlarged cross-sectional views illustrating a power supply section which is in power supply and power shutoff positions, respectively.
Figure 4:
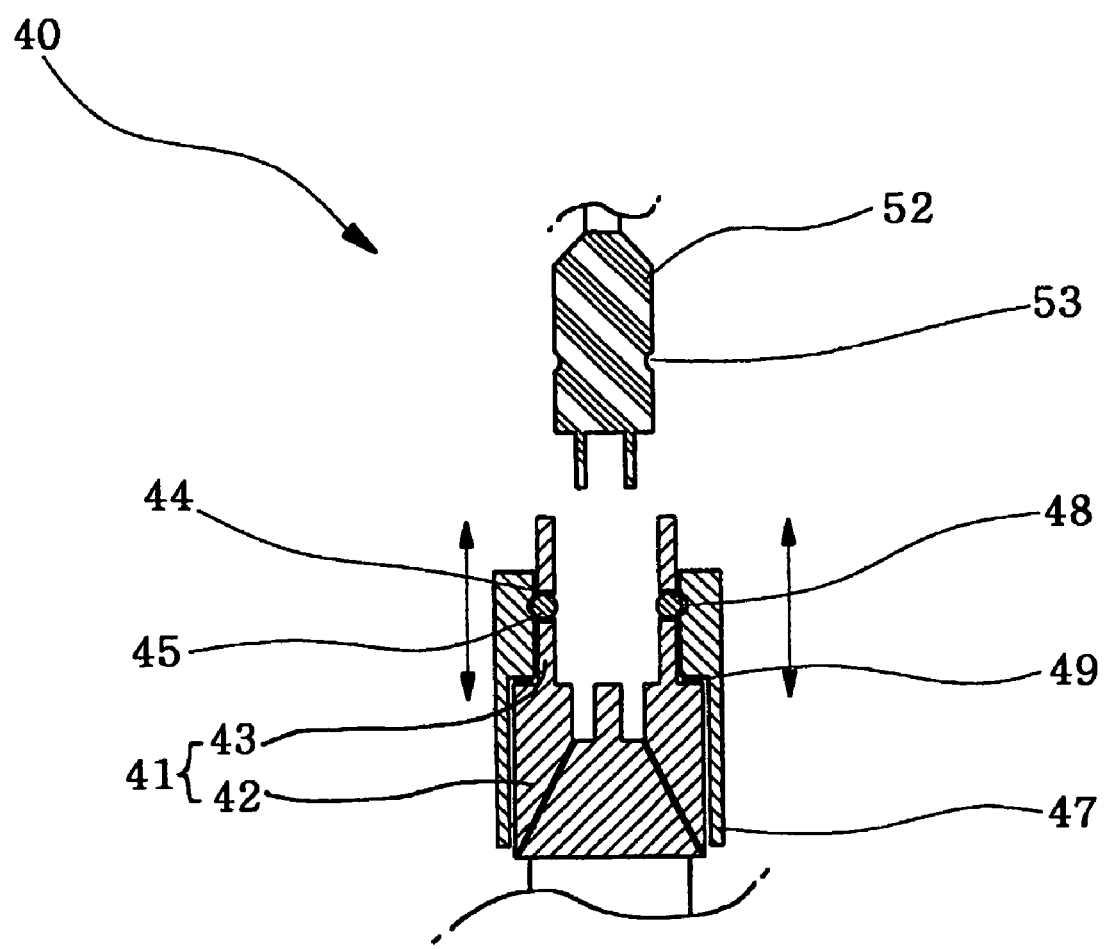
Figure 5:
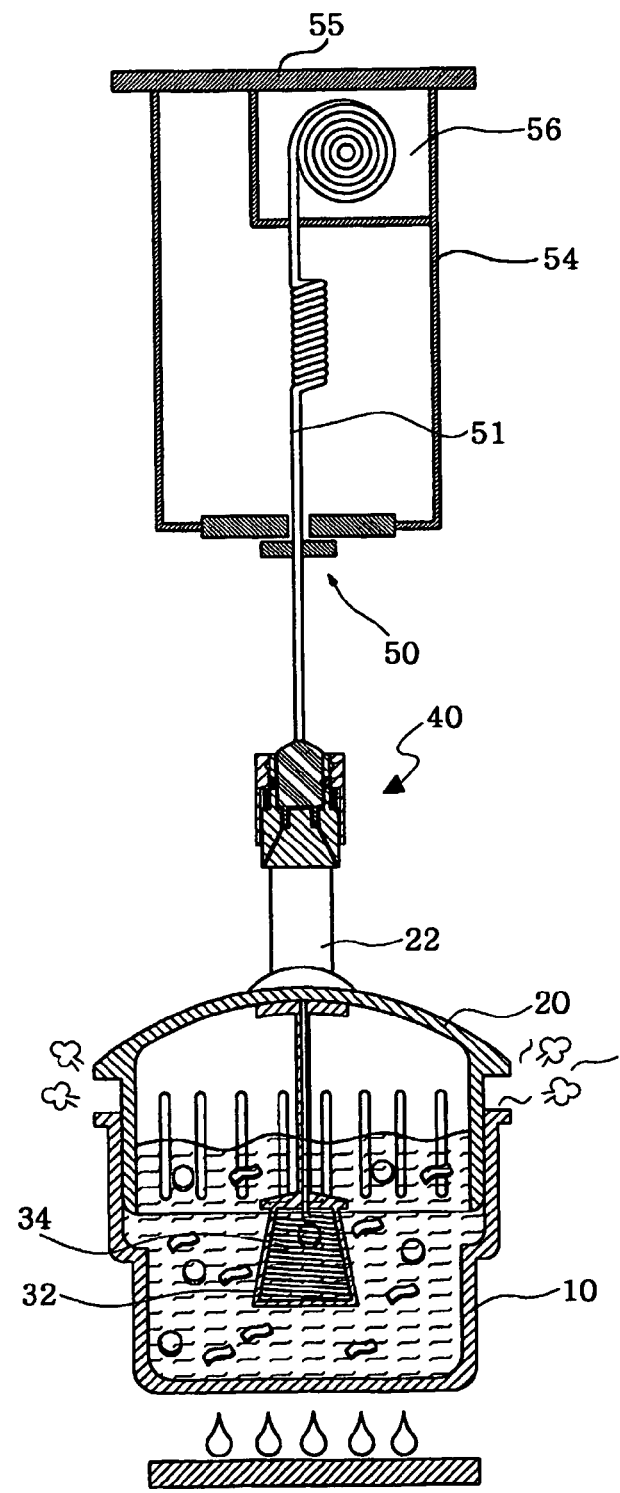
FIG. 5 is a cross-sectional view illustrating an in-use status of the boiling pot of FIG. 1.

FIG. 1 is an exploded perspective view illustrating a boiling pot having an electric heating means in accordance with a first embodiment of the present invention; and FIG. 2 is a cross-sectional view taken along the line I—I of FIG. 1, illustrating an assembled state of the boiling pot, FIGS. 3 and 4 is partial enlarged cross-sectional views illustrating a power supply section which is in power supply and power shutoff positions, respectively, and FIG. 5 is a cross-sectional view illustrating an in-use status of the boiling pot.

The cook pot A of the example is comprised of, as shown in FIGS. 1 and 2, a pot body 10, a lid 20 built in upper part of said pot body 10 and a handle 22 formed on the upper face of the lid 20. The supplement heating means 30 is formed inside the lid 20 to protrude to opposite the pot body 10 on the other side of the lid 20, and forms the steam deflation means which can control steam deflation according to the steam pressure in the cook pot on the side which is connected with the body of the lid, and equips the power supply connection means 40 connected to the above mentioned generating heating coil as electrically connected and can connect external power supply means 50.

In here, the supplement heating means 30 is formed as protrude to opposite direction of the pot body 10 on the lid 20, and coil section 34 having a truncated cone-shaped contour on the protruded a pair of terminals. And also, form the heating panel 32 at the out side of the coil section 34 which lid the coil section, it is for prevent of the contact with the water and food.

The said coil section 34 of the supplement heating means 30 is formed at opposite of the pot body on the other side of the lid. And more particularly, there is a the flange each of the pipe-shaped means was formed on, and stick a flange on the other side of the lid and another flange on the generating heat plate 32 of the heating means 30 which formed on one step by using conventional combine means such as welding or bolts.

And also, the coil section 34 of the said supplement heating means 30 is electrically connected with the power connection means 40 formed on the upper end of the handle 22.

The area of the border of the said lid 20, the cylindrical side wall 24 is formed which combine with the inside of the pot body 10 to around circumference, and the steam deflation means of the cylindrical side section 24 is formed. In here, it is sufficient to any shape of the steam deflation means has an appearance which is able to emit properly. In this example, a slit is formed as along the direction of the length (perpendicular to the direction of the circumference) at said cylindrical side 24, an opening of the slit which emit the steam to outside more and more according to steam pressure is higher and higher, and the other side, if decreased the steam pressure, the area of the opening is decreased by its own weight.

The said power connection means 40 as shown in FIGS. 3 and 4, which comprises a socket 41 and a pressing section 47 formed on the upper end of the handle 22, on the said socket 41 formed of a body part 42 connected with the lower part of the handle 22 and an opened holder section 43 which has a smaller outer diameter than that of the body part 42 at the upper end of said body part 42 and can insert a plug 52 of the power supply means 50. In here the appearance of the said socket 41 is either cylindrical or square, but in this example a cylindrical-shaped has been adopted for the sake of convenience of the explanation.

Due to the diameter of the said holder section 43 is smaller than that of said body part 42, and so step difference is occurred at the connection area of the holder section 43 and the said body part 42 and formed the press section 47 can move up and down and which insert at the outside of the said holder section 43 and body part 42. And moreover, there is formed a connection terminal which electrically connected with coil section 34 of the heating means 30 in the said holder 43, and the said connection terminal connect with the connection terminal of a plug 52.

The press section 47, which comprises the lower part which has larger diameter than outer diameter of the body 42 of the socket 41 and upper part which has larger diameter than the diameter of the holder section 43. Through holes are formed on wall of the said socket 41 and holder section 43 in the opposite direction each other, each of the through holes has a steel ball 45 inserted in it When a plug 52 inserted to the socket 41, said steel ball is inserted to an engagement groove 53 which formed at the plug 52, and have a role of maintain connection between the plug 52 and the socket 41 as stable.

Further, inside face of the upper part of the said press section 47, that is, at the inside joining with the holder part 43, grooves 48 having arc-shaped which having a similar size of said steel ball 45 is formed facing each other. Said arc-shaped groove 48 as explain below, which is providing for the spare where the rigid body ball can retreat when connecting and disconnecting the plug 52 to the holder part 43, and either inserted or extracted the steel ball 45 not projected from the inside of the holder part 43.

Meanwhile, the engagement groove 53 having same size of the steel ball 45 is formed at the outer surface of the plug 52, said engagement groove 53 which accord with the through hole 44 of the holder section 43 is formed when plug 52 totally inserted the holder section 43.

when the plug 52 is inserted into the holder section 43 of the socket 41, and the steel ball 45 into the engagement groove 53, it combines the plug 52 and the socket 41 is stabilized.

And, as explained above, there occurs the step difference at the connection area of the body section 42 of the socket 41 between the holder part 43, the step difference opposites with the step difference of the connection area of the lower part and upper part of said pressing section 47. By open the spring 49 in the step part which is formed on the said pressing section 47 and socket 41, the pressing section is supported elastically along the direction of the length.

Moreover, because the holder section 43 of said sockets 41 are opened to the upside, it is easy to inflow impurities such as steam and dirt when disconnect the plug 52. Therefore, it is preferable to form a cover which can shut off the opened face, said cover is positioned at where can not disturb when inserting or removing, that is, stick by the conventional hinge device of the outer circumference of the press section 47.

Now, explain about the operation of the said power supply connection element 40 by using the FIGS. 3 and 4. First of all, in FIG. 3 shows the connection state of the plug 52 into the socket 41, the steel ball 45 is pressed to inside by the press section 47, and the part of the steel ball 48 is inserted to the engagement groove 53 of the plug 52. In this case, said steel ball played a role of catching function by the steel ball 45 inserting to the engagement groove 53 to catch on, can maintain stability combination state both of the plug 52 and the socket 41.

And next, the FIG. 4 shows connection or disconnection of the said plug 52 to the socket. First, when the plug 52 is connected to the socket 47, if the steel ball 45 is positioned at the groove 48 of the press section 41, the steel ball 45 could retreat to said groove 48. Therefore, the plug 52 inserted to the holder part 43 of the socket 41 without disturb of the rigid body ball 45. When the plug 52 to the holder section 43 is connected entirely, and releases the press section 47. At this time, said press section 47 is returned to the original position, and the plug 52 and the socket is to be as FIG. 3 can maintains stability of the connection state.

While, the operation of pulling out said plug 52 from said holder 43 to the socket 41 is compare with the above connection, it has a only difference of the inserting separating operation and the other are equal, the detail description is omitted.

Thereafter, the body 42 of said socket 41 which are able to form a plurality of drain holes 46 which connected with the opened bottom of the holder section 43 by the through inside, and said drain hole 46 is for the discharge of water which inside of the said holder section 43 by the condensation of the steam occurred in cooking. In this time, said socket 41 and plug 52 are insulated by conventionally method.

And then, said pressing section 47 is maintained at said socket 41 by the maintaining means (not illustrated). In other words, said pressing section 47 is maintained on the socket 41 with as much power which can endure elastic strength of a spring 49. Said maintaining means can be, for instance, a stopper having protrusion-shaped which protrude to a direction of radius or rib and grooves-shaped which are formed on each of the lower inside of said pressing section 47 and outside of the socket 41, however the detail description and drawing are omitted.

Next, explain the power supply means 50 according to the present example. Said power supply means 50 which is for supply the external power to the supplement heating means 30, and which comprises the electric cable 51 is connected an end up to the power supply (not illustrated), and the plug 52 which connected the other end up to the said electrical cable 51.

The electrical cable 51 is preferably as freely extendible for compare with the formed position of the cook pot A. For this purpose, a keeping unit 54 which having box-shaped is formed which can keep and withdraw the electrical cable 51, and fixed on the wall by the supporter bar 55 which is formed at the one side of the keeping unit 54 (the opposite direction of the direction of withdraw electrical cable 51) and the winding section 56 is formed which can put in as elastically electrical cable inside of the keeping unit 54

Further, the withdraw hole is formed on the side of said keeping unit 54, said withdraw hole can pass the electrical cable 51 and not pass the plug 52 which formed on the step section. Therefore, when no cooking, put the electrical cable 51 in the said keeping unit 54 and when cooking, pull the said plug 52 and easily withdraw as wanted length of the electrical cable 51.

Meanwhile, as in this embodiment example, said supplement heating means 30 is turned on/off and the temperature is controlled by the temperature control device (not illustrated).

Below, explain the process of the using the cook pot of the example 1 with FIG. 5 according to the present invention.

First, put on a heating means like a gas range a cook pot with its pot body 10 filled with water or food and withdraw said plug 52 and insert it in the socket 41 formed at upper end of the handle 22.

Next, turn on the heating means and if the power switch of the temperature control element (not illustrated) is turned on, water or food in the cook pot is heated quickly by the external heating means (ex. Gas range) and supplement heating element 30 in the cook pot A, that is heating plate 32 having coil section 34.

Once water or food start boiling, by turn off the power switch or stop or decrease of heat supply from the supplement-heating element 30 by control temperature, can save energy and prevent over heating water or food.

On the other hand, if steam is excessively generated to lift said lid 20, as the steam discharge slots 26 are increasingly opened in proportion to an increase in steam pressure, excessive steam is discharged to the outside through the steam discharge slots 26. Consequently, overflowing of water and/or food item is prevented. Thereafter, as a pressure falls, the cover 20 is automatically lowered by its own weight close the slit on the side of the pot body 12. In this way, it is possible to maintain a constant steam pressure and a constant temperature and thereby cook the food item within a short period of time.

If cooking of the food item is completed in this manner, as the user presses the press section 52, separating the plug 52 from the holder section 43, in this time, the plug 52 and electrical cable 51 quickly put in the putting part 54 by the elastic power of the winding section.

EXAMPLE 2

Figure 6:
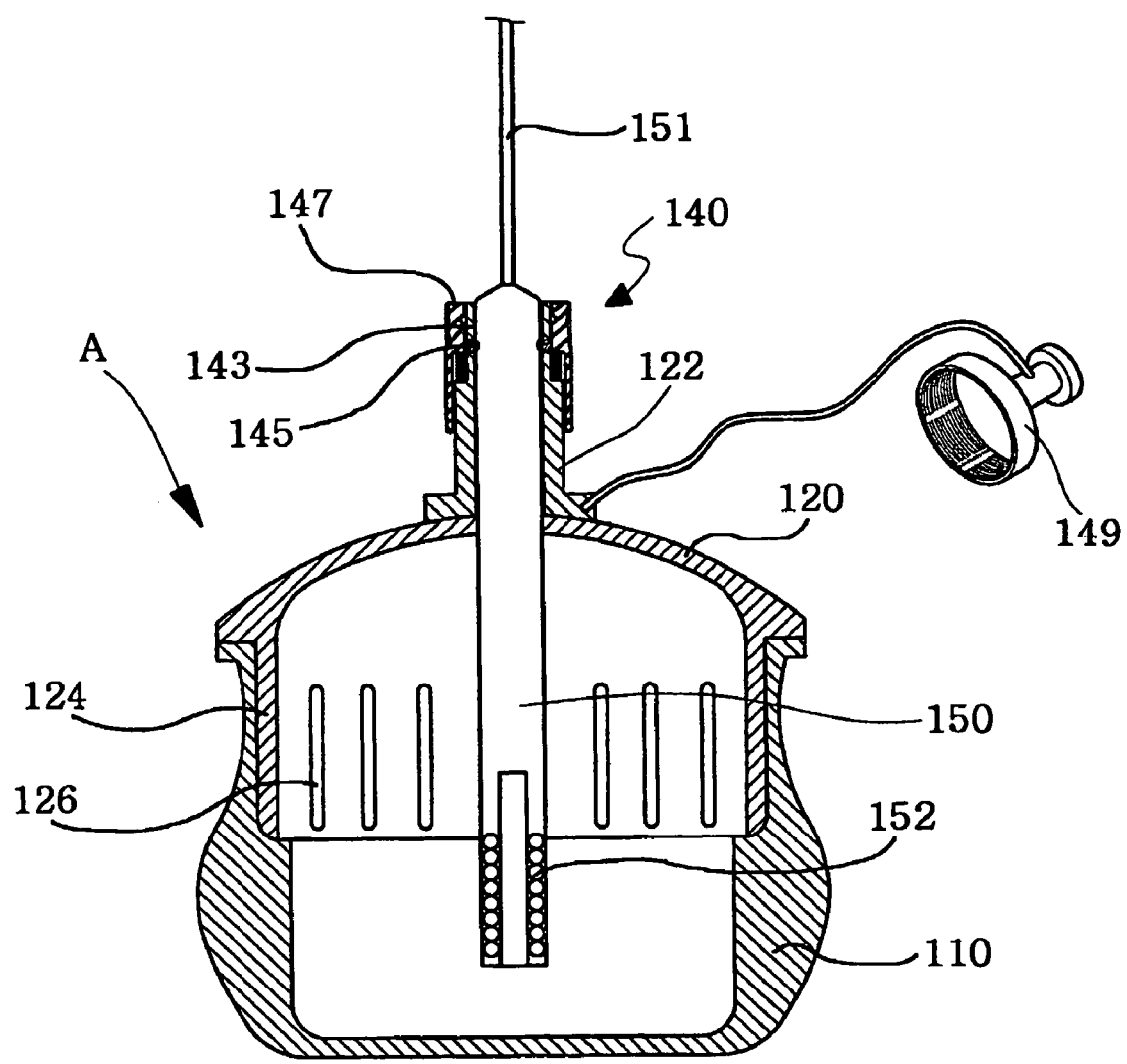
FIG. 6 is a schematic cross-sectional view illustrating a boiling pot having an electric heating means in accordance with a second embodiment of the present invention.

A second embodiment according to the present invention, as shown in FIG. 6, in the cook pot comprising the pot body 110, the lid 120 inserted in the pot body 110 and the handle formed on the upper face of said lid 120, form the side which projected to connected direction with above pot body 110 at the border of the other side of the lid, install the handle 122 which having pipe shape for inserting the supplement heating means 150 from the external.

In the cook pot A in the first preferred embodiment of the present invention, the supplement heating means 30 fixed on the lid 20 and the external power supply means 50 is separated and connected to the power supply connecting means formed on the upper end of the handle. There are differences in the second embodiment such as the power supply means 50 can insert and separate through the hole which is formed on the handle 122 and connect to the supplement heating means 150 directly without opening the power supply connecting means in external power supply means.

While, though not illustrated in detail in the FIG. 6, the connecting means 140 which connect the supplement heating means 150 is able to form on the upper end of the handle 122, herein, the holder part 143 in the connecting part 140, the steel ball 145 installed on the through hole which formed on the wall of the holder part 143, pressing section 147 which inserted the holder section 143, groove formed on the inside of the pressing section 147 and engagement groove formed on the outside of the supplement heating means 150 and having same composition of the first experiments, so detailed description of these compositions are omitted.

As shown in the FIG. 6, the cook pot A in the present example, said handle 122 is formed projecting upper face on the lid 120, and said handle 122 is formed in the pipe-shaped, in which said auxiliary heating means 150 can be inserted.

Also, on the upper end of the handle 122, a connecting means 140 is formed to be connect with the said supplement heating means 150, the composition of said connecting means 140 in the example 1 is same with those of the socket 41 and pressing section 47. However, the only difference is in the first example, the plug 52 inserted to the inside of the holder section 43 of the socket 41, and in the present example, a rod-shaped heating means via connecting means 140 to cook pot A. In other words, the engagement groove 53 has arc-shaped for insertion of said steel ball 45 is formed on the out side of the plug 52, and engagement groove identical with those in Example 1 are formed on the outer surface of the rod-shaped supplement heating means 150 in Example 2. The other compositions or operation are same with the first experiment so detailed description is omitted.

In the present example, the one end part of the supplement heating means 150 connected with the electrical cable 151 and another end having stored in the coil 152 according the some range along the length of the rod-shaped supplement means 150. Here, the said coil 152 electrically connected with the electrical cable 151.

On the other side, the said handle 122 formed as a pipe-shaped, when the supplement heating means 150 is not insert the handle 122, the lid 120 installed on the pot body 110 the cook pot A always vent with the outer air. This is a reason of water or food in the cook pot boiled lately with provides the reason of the inflow of dusts and impurities into the cook pot while cook pot A is not in use. Therefore, to solve these problems, it is preferable to provide the cover 149 which installed on the upper end of said handle and with can opening and shutting, here, said cover 149 connect with lid 120 or handle 122 by the string for prevent of loss.

Next, explain the method of the using of the cook pot A according to the second embodiment in the present invention.

First, the cook pot filled with water and food is on the heating means such as gas range and is heated. At this time, open the cover 149 which installed on the upper end of the handle 122 and with press the pressing section 147 of the connecting means 140 and insert the rod-shaped supplement heating means 150 to the handle 122, after then prove the power to the supplement heating means 150 by turn on the switch of the temperature control means.

When water or food boiling in the cook pot A, the said supplement heating means 150 is removed or the opening of the upper end of the handle 122 is shut off by the cover or control the temperature of the supplement heating means 150 by the temperature control means, whereby cooking can be maintain the temperature and pressure in the cook pot A.

EXAMPLE 3

Figure 7:
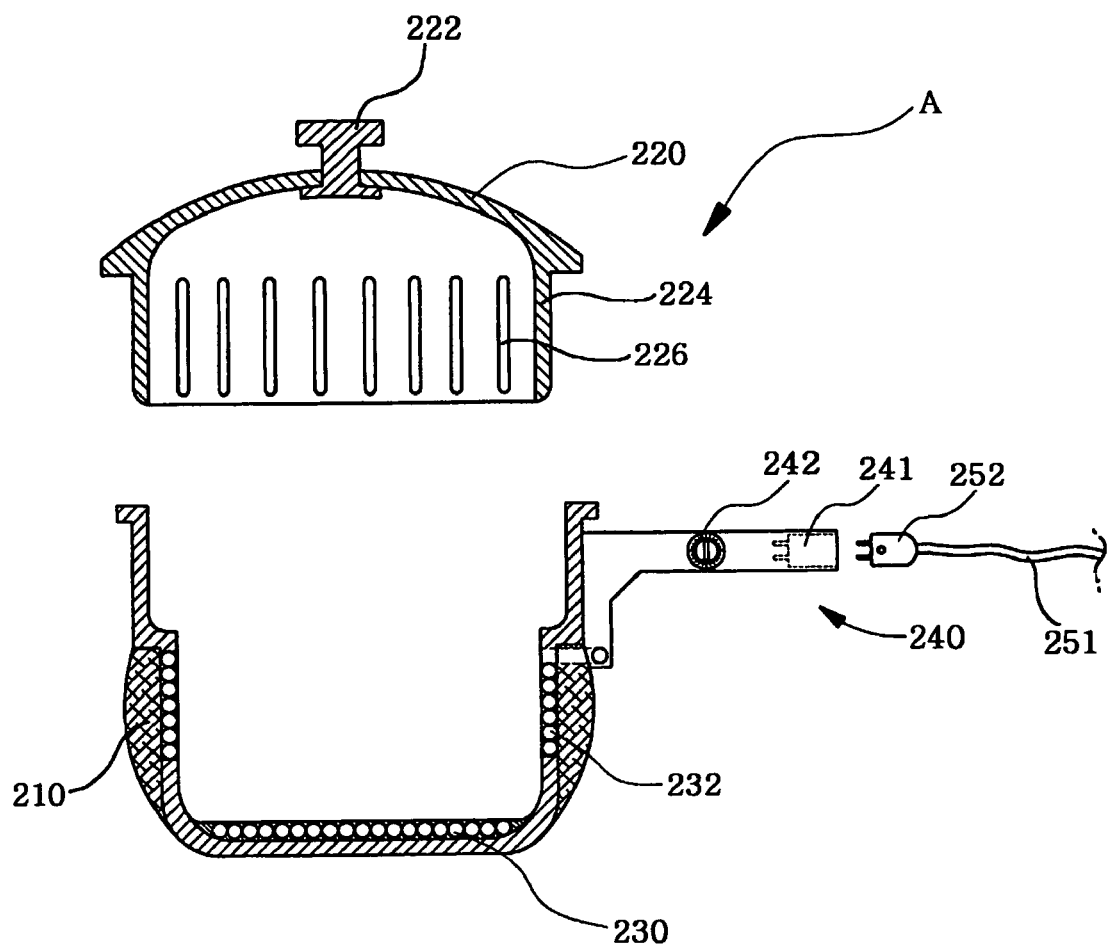
FIG. 7 is a schematic cross-sectional view illustrating a boiling pot having an electric heating means in accordance with a third embodiment of the present invention.

Next, explain the third embodiment according to the present invention, with FIG. 7.

As shown in the FIG. 7, the cook pot A in the third embodiment is characterized in, the side which is formed to be projected to the direction of the combination of the pot body 210 on the border of the outside of the lid 220 and having a steam deflation element which can control stream deflation according to the steam pressure in the cook pot, and with the heat generating coil 230, 232 is built at the bottom and side, and power supply means 240 which is connected with the external power supply means which electrically connected with the said heat generating coil 230, 232. Further, the ordinary handle 222 is formed on the upside of the lid 220 of the cook pot A.

Said power supply connection means 240 having a socket 241 which is connected to the temperature control switch 242 and plug 252, and electrically connected with the said heat generating coil 230, 232. Herein, it is preferable to form the handle combine with the power supply connecting means 240 for the simple composition, in this case, each socket 241 and temperature control switch 242 is formed preferably on the end and side of said handle respectively.

Also, the steam deflation element in the present embodiment which comprises a slit 226 which formed on the side 224 of the cover 220 along the direction of the length, as same with said first and second embodiment.

So far the cook pot of the present invention has been described through specific embodiments, but should not be confined or limited to these examples. For it is obvious that persons who have ordinary knowledge in the field to which the present invention belongs can variously modify the present invention within the extent they do not depart from its technical ideas. The technical extent of the present invention includes not merely the constructions described in its patent claims but all the other constructions also, which have equable relationships with the present invention.

Industrial Applicability

According to the present invention, a time required to heat water from a normal temperature to boiling point can be significantly shortened, and energy consumption decreased And also, according to the cook pot of the present invention, it is not necessary to frequently opening and shutting a lid, and steam is controlled by the steam deflation means which formed on the lid so, not only maintain the temperature and pressure of the water or food but also prevent the safety accident which occurred when frequent opening and shutting a lid while cooling.

What is claimed is:

1. A cook pot having a pot body which contains water and food, and a lid for opening and shutting the opened upper part of the pot body, which comprises:
   an auxiliary heating apparatus which is formed at the inner side of the lid protruding to inside of said pot body;
   a side portion formed at the outer circumferential border of the lid protruding along the direction of connection with said pot body, and having a steam ventilation element which can control steam ventilation according to the steam pressure in the cook pot;
   a lid handle secured to an upper surface of the lid; and
   a power supply connecting component which is formed at said handle and connects or disconnects an external power supply portion and is electrically connected to said auxiliary apparatus.

2. The cook pot according to claim 1, wherein a heating coil is formed at the upper end of said auxiliary heating apparatus and a heating panel is formed enclosing outer periphery of said coil.

3. The cook pot according to claim 1, wherein said steam ventilation element is a plurality of slits which is formed on the side of the lid along the direction of connection with said pot body.

4. The cook pot according to claim 1, wherein said power supply connecting component comprises:
   a socket having a body and a holder;
   a steel ball which is placed in a through hole formed on a wall of the holder;

a pushing portion which is placed at the outside of a socket and can move up and down along the direction of the length of connection with said pot body; and a spring formed between said holder and said pushing portion.

5. The cook pot according to claim 4, wherein, at the holder of the socket, a plug receiver is formed for receiving plug of said external power supply portion, and connecting device is installed for electrically connecting to the connecting end of said plug.

6. The cook pot according to claim 4, wherein an arc-shaped groove is formed inside said pushing portion with the same size as said steel ball in such a way that said arc-shaped groove is combined with the steel ball when said pushing portion is pushed down.

7. The cook pot according to claim 5, wherein an engagement groove is installed on the outward periphery of the plug with the same size as said steel ball in such a way that said steel ball hangs on the engagement groove when said plug is inserted into the holder of the socket.

8. The cook pot according to claim 6, wherein an engagement groove is installed on the outward periphery of the plug with the same size as said steel ball in such a way that said steel ball hangs on the engagement groove when said plug is inserted into the holder of the socket.

9. A cook pot having a pot body which contains water and food, and a lid for opening and shutting the opened upper part of the pot body, which comprises:

a side portion formed at the outer circumferential border of the lid protruding along the direction of connection with said pot body, and having a steam ventilation element which can control steam ventilation according to the steam pressure in the cook pot;

a pipe-shaped handle formed at the upper surface of the lid; and an auxiliary heating apparatus which is inserted in the handle and connected to an external electric cable.

10. The cook pot according to claim 9, wherein said steam ventilation element is a plurality of slits formed on the side of the lid along the direction of connection with said pot body.

11. The cook pot according to claim 9, wherein said auxiliary heating apparatus is formed in the shape of a bar and a coil is built in at an end opposite of the electrical cable, wherein said coil and electrical cable are connected electrically.

12. The cook pot according to claim 9, wherein a power supply connecting component is formed at the upper end of the handle to be connected with said auxiliary heating apparatus, said power supply connecting component comprising:

a holder formed on the upper end of said handle;

a steel ball placed on a through hole of a wall of the holder part;

a pushing portion which is formed at the outside of a socket and can move up and down along the direction of connection with said pot body; and a spring formed between said holder and said pushing portion.

13. The cook pot according to claim 12, wherein an arc-shaped groove is formed inside said pushing portion with the same size as said steel ball in such a way that said arc-shaped groove is combined with the steel ball when said pushing portion is pushed down.

14. The cook pot according to claim 13, wherein an engagement groove is installed on the outward periphery of said auxiliary heating apparatus with the same size as said steel ball in such a way that said steel ball hangs on the engagement groove when said auxiliary heating apparatus is inserted into the holder of the socket.

15. The cook pot according to claim 12, wherein said power supply connecting component comprises a socket and temperature controller, installed in a handle formed at the side of the pot body.

16. The cook pot according to claim 15, wherein said steam ventilation element is a plurality of slits formed on the side of the lid along the direction of connection with said pot body.

17. The cook pot according to claim 12, wherein an engagement groove is installed on the outward periphery of said auxiliary heating apparatus with the same size as said steel ball in such a way that said steel ball hangs on the engagement groove when said auxiliary heating apparatus is inserted into the holder of the socket.

18. A cook pot having a pot body which contains water and food, and a lid for opening and shutting the opened upper part of the pot body, which comprises:

a coil formed on a bottom and a side of said pot body;

a power supply connecting component which is connected electrically to said coil and connected to an external power supply portion; and a side part formed at the outer circumferential border of the lid protruding vertically along the side and in the direction of connecting with said pot body, and having a steam ventilation element which can control steam ventilation according to the steam pressure in the cook pot.

19. The cook pot according to claim 18, wherein said steam ventilation element is a plurality of slits formed on the side of the lid along the direction of connection with said pot body.

* * * * *